United States Patent
Yokoo et al.

(10) Patent No.: US 11,189,850 B2
(45) Date of Patent: Nov. 30, 2021

(54) REFORMER, CELL STACK APPARATUS, FUEL CELL MODULE, AND FUEL CELL APPARATUS

(71) Applicants: KYOCERA CORPORATION, Kyoto (JP); DAINICHI CO, LTD., Niigata (JP)

(72) Inventors: Naoki Yokoo, Niigata (JP); Osamu Yamazaki, Niigata (JP); Tatsuya Kanbayashi, Niigata (JP); Takayuki Maruyama, Niigata (JP); Naruto Takahashi, Kirishima (JP)

(73) Assignee: KYOCERA Corporation, Kyoto (JP)

( * ) Notice: Subject to any disclaimer, the term of this patent is extended or adjusted under 35 U.S.C. 154(b) by 22 days.

(21) Appl. No.: 16/309,502

(22) PCT Filed: Jun. 13, 2017

(86) PCT No.: PCT/JP2017/021878
§ 371 (c)(1),
(2) Date: Dec. 13, 2018

(87) PCT Pub. No.: WO2017/217434
PCT Pub. Date: Dec. 21, 2017

(65) Prior Publication Data
US 2019/0214665 A1   Jul. 11, 2019

(30) Foreign Application Priority Data
Jun. 16, 2016  (JP) .............................. JP2016-120294
May 26, 2017  (JP) .............................. JP2017-105048

(51) Int. Cl.
*H01M 8/0612*  (2016.01)
*C01B 3/38*   (2006.01)
(Continued)

(52) U.S. Cl.
CPC ............. *H01M 8/0618* (2013.01); *C01B 3/38* (2013.01); *H01M 8/0612* (2013.01); *H01M 8/12* (2013.01);
(Continued)

(58) Field of Classification Search
CPC ................................................... H01M 8/0618
See application file for complete search history.

(56) References Cited

U.S. PATENT DOCUMENTS

2004/0115494 A1   6/2004  Tamura et al.
2004/0255514 A1*  12/2004 Sakakida ............. B01J 19/2485
                                                         48/127.9
(Continued)

FOREIGN PATENT DOCUMENTS

CN   1497757 A    5/2004
CN   102781820 A  11/2012
(Continued)

OTHER PUBLICATIONS

Machine Translation of JP 2012-201583; accessed and printed May 18, 2020 (Year: 2012).*
(Continued)

*Primary Examiner* — Edward J. Schmiedel
(74) *Attorney, Agent, or Firm* — Viering, Jentschura & Partner MBB

(57) ABSTRACT

A reformer of the present disclosure includes a reformer body which has a cylindrical shape and extends horizontally, introducing raw fuel and water to perform a reforming reaction, the reformer body including therein a vaporization portion which generates steam, and a reforming portion which reacts the steam generated in the vaporization portion with raw fuel to generate a reformed gas; a raw fuel introduction pipe which introduces the raw fuel into the reformer body; a water introduction pipe including therein a (Continued)

water passage which introduces water into the reformer body; and a vaporization accelerating portion which is disposed in at least one of the vaporization portion and the water introduction pipe and accelerates vaporization of water in the vaporization portion.

15 Claims, 15 Drawing Sheets

(51) Int. Cl.
  *H01M 8/12* (2016.01)
  *H01M 8/2457* (2016.01)
  *H01M 8/2484* (2016.01)
  *H01M 8/2475* (2016.01)
(52) U.S. Cl.
  CPC ....... *H01M 8/2457* (2016.02); *H01M 8/2475* (2013.01); *H01M 8/2484* (2016.02)

(56) References Cited

U.S. PATENT DOCUMENTS

| | | | | |
|---|---|---|---|---|
| 2006/0083956 A1* | 4/2006 | Ukai | ............... | B01J 19/0006 |
| | | | | 429/420 |
| 2006/0251939 A1* | 11/2006 | Bandhauer | ........ | H01M 8/04708 |
| | | | | 429/435 |
| 2012/0321971 A1 | 12/2012 | Maenishi et al. | | |
| 2013/0064723 A1 | 3/2013 | Tada et al. | | |
| 2015/0151964 A1 | 6/2015 | Kang et al. | | |

FOREIGN PATENT DOCUMENTS

| | | |
|---|---|---|
| EP | 3070775 A1 | 9/2016 |
| JP | H05317758 A | 12/1993 |
| JP | 2001064658 A | 3/2001 |
| JP | 2003192307 A | 7/2003 |
| JP | 2004149402 A | 5/2004 |
| JP | 2005158527 A | 6/2005 |
| JP | 2007314399 A | 12/2007 |
| JP | 2008007349 A | 1/2008 |
| JP | 2008012517 A | 1/2008 |
| JP | 2012201583 A | 10/2012 |
| JP | 2016177945 A | 10/2016 |
| WO | 2014002468 A1 | 1/2014 |

OTHER PUBLICATIONS

Machine translation of JP 2007-314399; accessed and printed Feb. 12, 2021 (Year: 2007).*

* cited by examiner

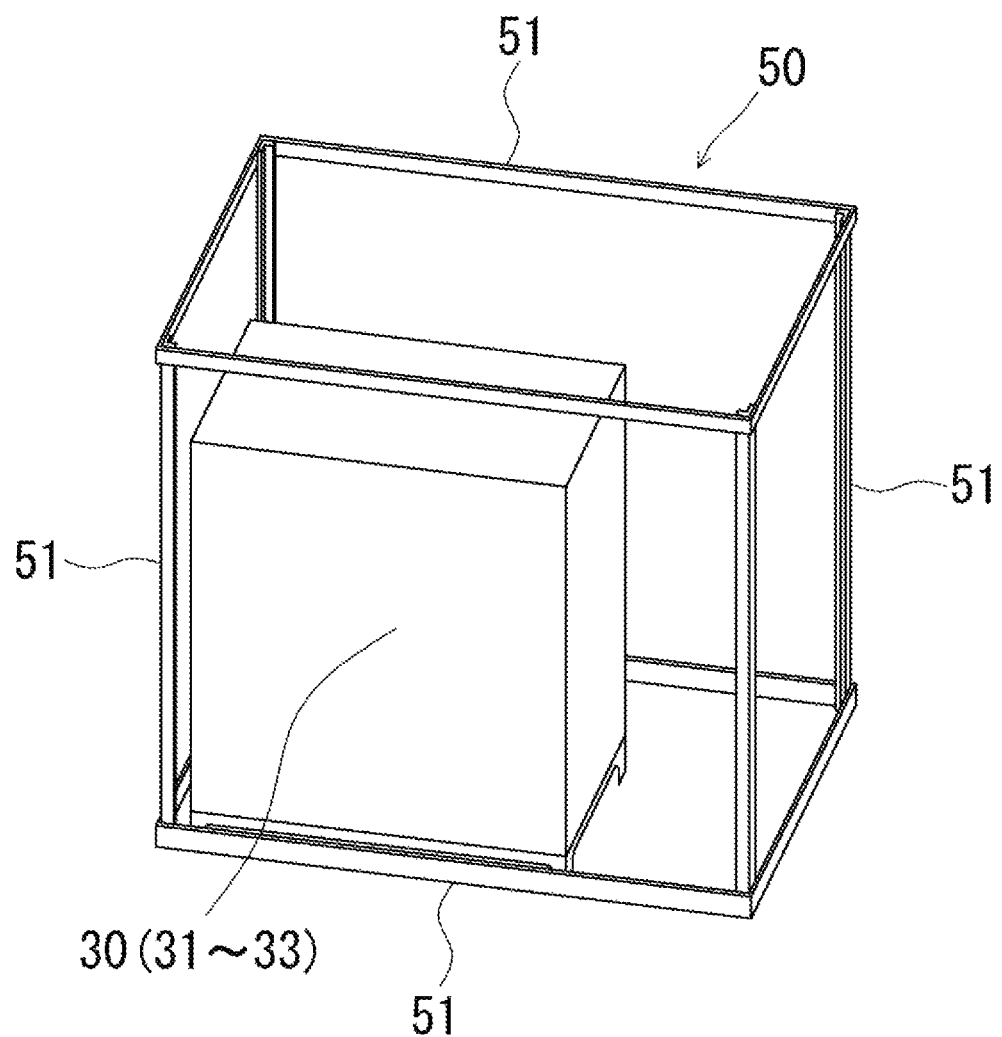

REFORMER, CELL STACK APPARATUS, FUEL CELL MODULE, AND FUEL CELL APPARATUS

CROSS-REFERENCE TO RELATED APPLICATIONS

This application is a national stage entry according to 35 U.S.C. 371 of PCT Application No. PCT/JP2017/021878 filed on Jun. 13, 2017, which claims priority to Japanese Application Nos. 2016-120294 filed on Jun. 16, 2016, and 2017-105048 filed on May 26, 2017, which are entirely incorporated herein by reference.

TECHNICAL FIELD

The present disclosure relates to a reformer for generating a fuel gas to be introduced into a fuel cell, and a cell stack apparatus, a fuel cell module, and a fuel cell apparatus which include the reformer.

BACKGROUND

In recent years, as next generation energy, various proposals have been made for a fuel cell module in which a fuel cell capable of obtaining electric power by using a fuel gas (hydrogen-containing gas) and air (oxygen-containing gas) is housed in a housing and a fuel cell apparatus in which the fuel cell module is housed in an exterior case.

In the cell stack apparatus, a reformer is disposed above a fuel cell stack, and the reformer includes a vaporization portion which vaporizes water to generate steam and a reforming portion which steam-reforms raw fuel (including gaseous raw fuel gas) by using the steam generated in the vaporization portion. A raw fuel introduction pipe and a water introduction pipe are connected to the vaporization portion disposed on the upstream side of the reformer, and the steam generated in the vaporization portion is mixed with the raw fuel and is introduced to the reforming portion so that the raw fuel is reformed in the reforming portion.

Generally, a fuel cell module constituting a fuel cell apparatus is configured by housing the above-described cell stack apparatus in a housing. A reformed gas containing hydrogen as a component from the raw fuel introduced into the reformer and water is generated and introduced into the fuel cell stack.

CITATION LIST

Patent Literature

Patent Literature 1: Japanese Unexamined Patent Publication JP-A 2005-158527
Patent Literature 2: Japanese Unexamined Patent Publication JP-A 2016-177945

SUMMARY

The reformer of a non-limiting aspect of the present disclosure includes a reformer body which has a cylindrical shape and extends horizontally, introducing raw fuel and water to perform a reforming reaction, the reformer body including therein a vaporization portion which generates steam and a reforming portion which reacts the steam generated in the vaporization portion with raw fuel to generate a reformed gas; a raw fuel introduction pipe which introduces the raw fuel into the reformer body; a water introduction pipe including therein a water passage which introduces water into the reformer body; and a vaporization accelerating portion which is disposed in at least one of the vaporization portion and the water introduction pipe and accelerates vaporization of water in the vaporization portion.

The cell stack apparatus of the non-limiting aspect of the present disclosure includes a cell stack including a plurality of fuel cells which are each configured to generate electric power with a fuel gas and an oxygen-containing gas, include a gas passage penetrating inside of each of the fuel cells in a longitudinal direction thereof, and burn the fuel gas not used for power generation on an upper end side thereof. The cell stack apparatus further includes a manifold which communicates with the gas passage and introduces a fuel gas into the gas passage, and the reformer described above connected to the manifold and disposed above the cell stack.

The fuel cell module according to the non-limiting aspect of the present disclosure includes the cell stack apparatus described above and a housing which houses the cell stack apparatus.

The fuel cell apparatus of the non-limiting aspect of the present disclosure includes the fuel cell module described above, an auxiliary machine which operates the fuel cell module, and an exterior case which houses the fuel cell module and the auxiliary machine.

BRIEF DESCRIPTION OF DRAWINGS

Other and further objects, features, and advantages of the present disclosure will be more explicit from the following detailed description taken with reference to the drawings wherein:

FIG. 20 is an exploded perspective view illustrating an example of a fuel cell apparatus of a non-limiting embodiment.

DETAILED DESCRIPTION

Figure 1:
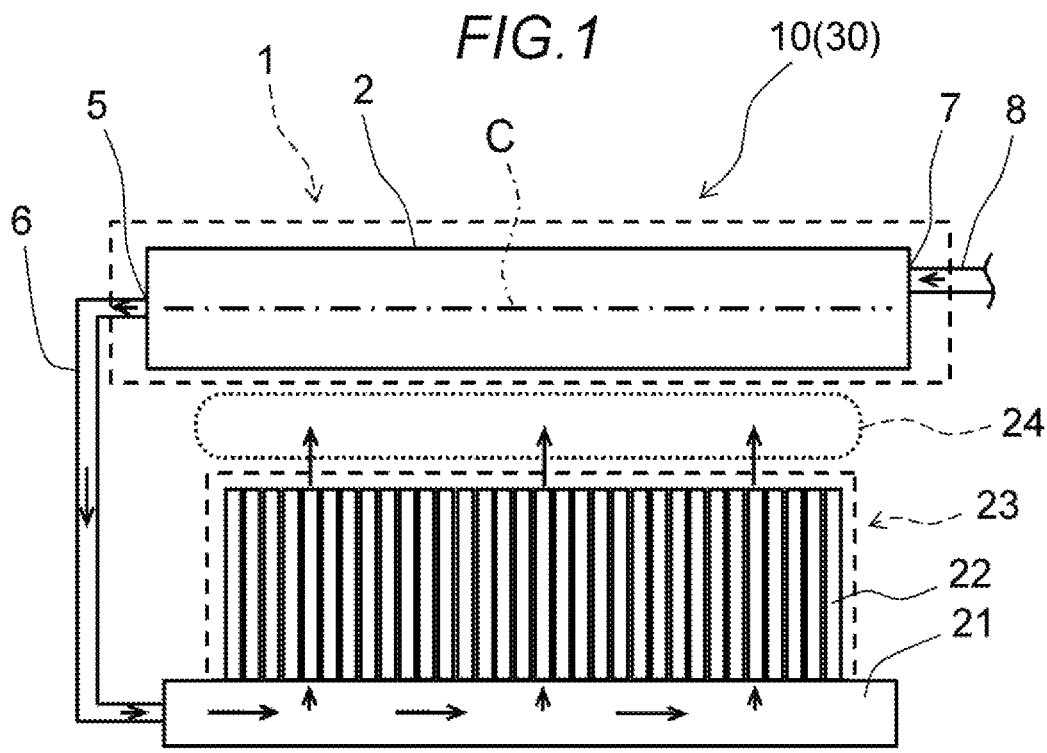
FIG. 1 is a side view illustrating a configuration of a cell stack apparatus of a first non-limiting embodiment.

By the way, in a reformer, it is required to perform an efficient reforming reaction. Here, particularly in the reformer performing steam-reforming, it is required not only to efficiently perform the reforming reaction in a reforming portion but also to efficiently vaporize water in a vaporization portion. Therefore, the reformer of the present non-limiting embodiment is made paying attention to directly or indirectly improving the vaporization efficiency of water in the vaporization portion. Hereinafter, the present non-limiting embodiment will be described in detail with reference to drawings.

FIGS. 1 to 3C are diagrams for describing a configuration of a reformer of a first non-limiting embodiment, and FIGS. 4 to 8 are diagrams each describing a configuration of a reformer corresponding to second to sixth non-limiting embodiments. Members having similar functions and configurations are denoted by the same reference numerals, and a detailed description thereof will be omitted.

FIG. 1 is a configuration diagram illustrating a configuration of a cell stack apparatus according to the first non-limiting embodiment. In the following drawings, the same members are denoted by the same reference numerals. In a cell stack apparatus 10 illustrated in FIG. 1, a reformer 1 is disposed above a cell stack 23 in which a plurality of columnar fuel cells 22 including a gas passage therein are disposed in an upright state and electrically connected to each other via current collecting members (not illustrated).

Here, the lower end of the fuel cell 22 constituting the cell stack 23 is fixed to a manifold 21 which introduces a reformed gas (hydrogen-containing gas) into the fuel cell 22 by an insulating adhesive, and one end of a reformed gas supply pipe 6 is connected to an end of the manifold 21. The other end of the reformed gas supply pipe 6 is connected to a reformed gas delivery port 5 to be described later. The end of the manifold 21 mentioned here is a side surface orthogonal to an arrangement direction of the fuel cells 22 among side surfaces of the manifold 21 and means the side surface on the same side as the reformed gas delivery port 5 side of the reformer 1. The reformed gas needs to be introduced into the fuel cell 22 via the manifold 21, and one end of the reformed gas supply pipe 6 may be connected to an upper surface or a lower surface of the manifold 21.

Both ends of the cell stack 23 is provided with a conductive member (not illustrated) including a current drawing portion for collecting current generated by power generation of the fuel cell 22 and drawing the current out to the outside. Here, the fuel cell 22 is, for example, a flat plate having a hollow center including a gas passage through which the reformed gas flows in a longitudinal direction, and a solid oxide fuel cell in which a fuel-side electrode layer, a solid electrolyte layer, and an oxygen-side electrode layer are sequentially disposed on a surface of a support body. When the solid oxide fuel cell is used as the fuel cell 22, the power generation temperature of the fuel cell 22 is extremely high, about 600° C. to 1000° C. As the fuel cell 22, a so-called cylindrical type or a striped type may be used.

In the above-described cell stack apparatus 10, raw fuel such as natural gas or kerosene is introduced into the reformer 1 to be described later to perform a reforming reaction. The reformed gas obtained by the reforming reaction is introduced into the manifold 21 via the reformed gas supply pipe 6, and the reformed gas introduced into the manifold 21 is introduced into the fuel cell 22. Air is introduced as an oxygen-containing gas from the outside of the fuel cell 22, and power generation is performed in the fuel cell 22 by using the reformed gas (hydrogen-containing gas) and air (oxygen-containing gas).

Between the cell stack 23 and the reformer 1, an ignition unit (not illustrated) for igniting the reformed gas is disposed. The temperature of the reformer 1 may be raised by combustion heat generated by burning a surplus reformed gas by configuring a combustion portion 24 located between the cell stack 23 and the reformer 1 to burn the surplus reformed gas not used for power generation in the fuel cell 22. As a result, it is possible to efficiently perform the reforming reaction in the reformer 1. In FIG. 1, the flow of the gas is indicated by arrows in the diagram. In a fuel cell module (30) of the present non-limiting embodiment, the above-described cell stack apparatus 10 is housed in a housing. As illustrated in FIG. 20, the fuel cell apparatus of the present non-limiting embodiment includes the fuel cell module (30), an auxiliary machine for operating the fuel cell module, and an exterior case for accommodating the fuel cell module and the auxiliary machine.

Figure 2:
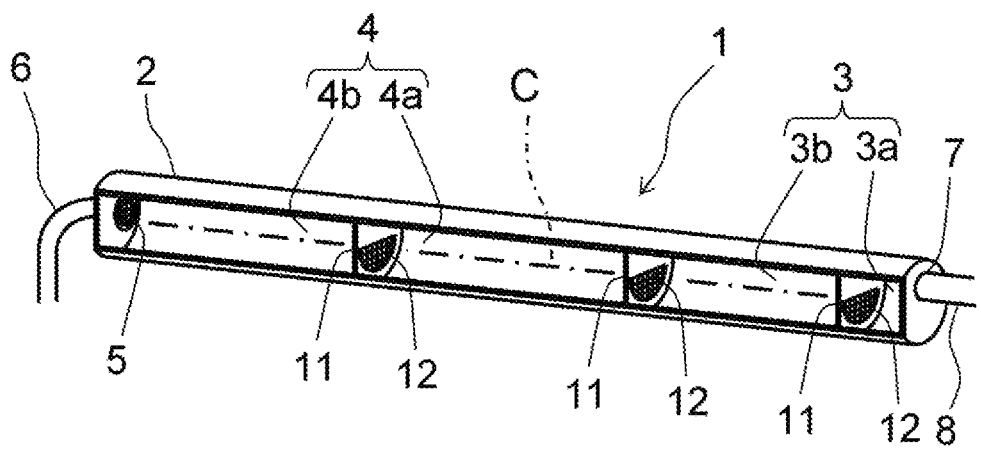
FIG. 2 is a perspective view illustrating a part of a reformer of the first non-limiting embodiment cut out to see an internal configuration thereof.

FIG. 2 is a perspective view illustrating the configuration of the reformer 1 of the first non-limiting embodiment and is an external perspective view illustrating a part thereof cut out to see the interior of the reformer 1. In FIG. 2, the configuration is partially omitted for illustration. The reformer 1 of FIG. 2 is provided with a reformer body 2 including a cylindrical introduction port 7 to which raw fuel gas and water are supplied at one end and which extends in the horizontal direction.

The reformer body 2 includes a vaporization portion 3 and a reforming portion 4. The vaporization portion 3 is an introduction portion into which raw fuel and water are introduced from the introduction port 7, including a first vaporization chamber 3a in which part of the introduced water is made steam and a second vaporization chamber 3b in which the introduced water is made steam. The reforming portion 4 includes a first reforming chamber 4a and a second reforming chamber 4b which reform the steam generated in the second vaporization chamber 3b with the raw fuel to generate a reformed gas. In the reformer 1, in performing steam-reforming, which is an efficient reforming reaction, most (preferably all) of the water introduced into the first vaporization chamber 3a is vaporized into steam in the second vaporization chamber 3b and mixed with the raw fuel, and the raw fuel mixed with steam is introduced into the first reforming chamber 4a. The reforming portion 4 may be a reforming portion including one room without being divided by a partition wall. The other end of the reformer body 2 is provided with the reformed gas delivery port 5 for delivering a reformed gas.

Here, the reformer 1 of FIG. 2 further includes three partition walls 11 which extend in a direction perpendicular to a central axis C of the reformer body 2 and partition the reformer body 2. Each of the partition walls 11 includes a flow permission portion 12 on the lower side through which the raw fuel and steam and the reformed gas may flow. Here, the lower side is a region from the lower end to the height of approximately ⅔ from the lower end in the height direction inside the reformer 1. A portion of the partition wall 11 other than the flow permission portion 12 is shielded and is a flow impossible portion through which raw fuel, steam, and a reformed gas do not flow. By forming the partition wall 11 with a member having high heat transfer, it is possible to accelerate heat transfer to the fluid flowing inside the reformer body 2 and to a reforming catalyst (not illustrated), thereby improving reforming efficiency. The flow permission portion 12 may also be provided in the entire height direction inside the reformer 1.

The flow permission portion 12 may be composed of a mesh member attached to the opening of the partition wall 11, or alternatively, may be composed of a plurality of slit-shaped cuts provided in the partition wall 11 as a plurality of openings elongated in one direction, or further, may be composed of a through hole. The interior of the reformer 1 is divided in the order of the first vaporization chamber 3a, the second vaporization chamber 3b, the first reforming chamber 4a, and the second reforming chamber 4b by three partition walls 11 from the introduction port 7 side to the reformed gas delivery port 5 side. The first vaporization chamber 3a or the second vaporization chamber 3b may not be provided. The reformer 1 may have one partition wall 11, or four or more partition walls 11.

Here, an introduction pipe 8 may be a double pipe (for example, raw fuel and water introduction pipe 25, and the like) of a raw fuel introduction pipe and a water introduction pipe as in a seventh non-limiting embodiment to be described later. In the double pipe, it is possible to provide a water introduction pipe inside the raw fuel introduction pipe or to provide a raw fuel introduction pipe inside the water introduction pipe. However, it is, of course, possible to separately provide the raw fuel introduction pipe and the water introduction pipe.

Figure 3A:
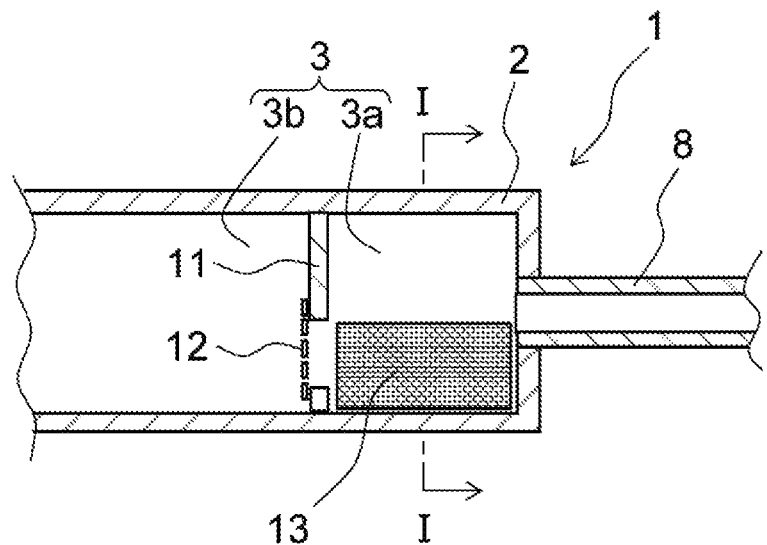
FIG. 3A is a cross-sectional view illustrating a structure of the reformer of the first non-limiting embodiment.
Figure 3B:
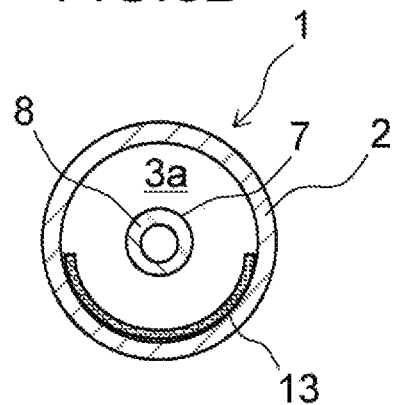
FIG. 3B is a cross-sectional view taken along line I in FIG. 3A.

FIGS. 3A and 3B are cross-sectional views illustrating the configuration of a reformer of a second non-limiting embodiment. FIG. 3A is a partial cross-sectional view in the longitudinal direction of a reformer body, and FIG. 3B is a cross-sectional view of a first vaporization chamber as viewed toward an introduction pipe, that is, a cross-sectional view taken along the line I in FIG. 3A. The introduction pipe 8 is connected to the first vaporization chamber 3a which is an introduction portion of the reformer 1.

Figure 3C:
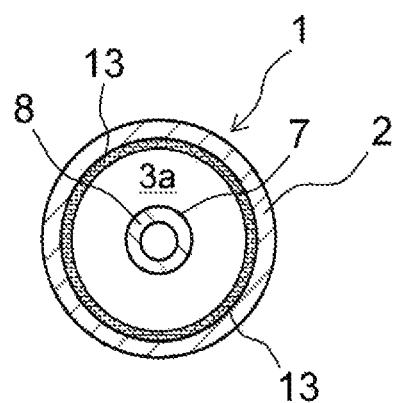
FIG. 3C is a cross-sectional view illustrating another structure of the reformer of the first non-limiting embodiment.

In the reformer illustrated in FIGS. 3A and 3B, in order to cover at least the bottom of the first vaporization chamber 3a in the vaporization portion 3, along the inner surface of the first vaporization chamber 3a, a water diffusion member 13 which is a vaporization accelerating member constituting a vaporization accelerating portion is disposed in an arc shape. In the following description of the non-limiting embodiment, the water diffusion member will be used as a vaporization accelerating portion. The water diffusion member 13 is provided along the inner surface of the reformer body 2 from the bottom surface side to the upper surface side of the reformer body 2. Although FIGS. 3A and 3B illustrate an example in which the water diffusion member 13 is provided to a height of half the height from the bottom side of the reformer body 2, there is no particular limitation in the height direction thereof. For example, as illustrated in FIG. 3C, the water diffusion member 13 may be provided to cover the entire inner circumference of the reformer body. In that case, the water diffusion member 13 may be of a cylindrical shape continuous without a gap in a circumferential direction or may be one obtained by cutting a flat plate and rolling the plate into a cylindrical shape.

Water and raw fuel are introduced from the introduction pipe 8 into the first vaporization chamber 3a which is an introduction portion. When water drips into the first vaporization chamber 3a, the water contacts the water diffusion member 13 disposed below the first vaporization chamber 3a. The water diffusion member 13 is a metal net formed of a metal material such as stainless steel which has heat resistance and does not corrode by water and has a fine mesh structure such that water expands along the metal net by a capillary phenomenon. Therefore, the water in contact with the water diffusion member 13 diffuses along the water diffusion member 13 without being accumulated at the dripped position. Water is heated while diffusing to become steam. The steam moves to the second vaporization chamber 3b through the flow permission portion 12 of the partition wall 11 and is completely made into steam in the second vaporization chamber 3b, and mixed with the raw fuel.

With the water diffusion member 13, water is not accumulated at the bottom of the vaporization portion 3, and the water is vaporized smoothly and continuously. Therefore, it is possible to directly accelerate the vaporization of water and to prevent phenomenon of a large amount of steam being generated at once due to the bumping of the accumulated water, and therefore stable vaporization of water may be performed. Therefore, since the reforming reaction is stabilized in the reformer 1, the flow rate of the reformed gas generated in the reformer 1 and introduced into the cell stack 23 is stabilized, and stable power generation may be performed. Regardless of the configuration of the introduction pipe 8, the water diffusion member 13 may be provided in any shape of introduction pipe through which water flows.

Figure 4:
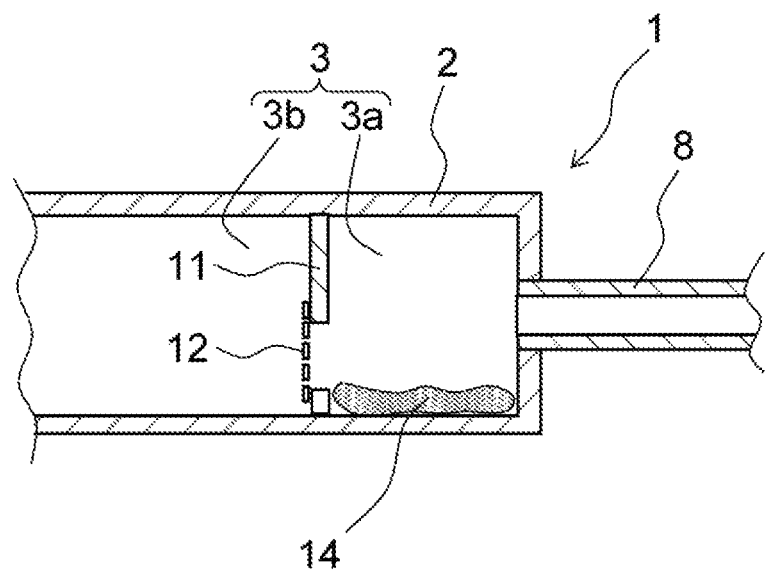
FIG. 4 is a partial cross-sectional view of a reformer of a second non-limiting embodiment.

FIG. 4 is a partial cross-sectional view illustrating the configuration of a reformer of the second non-limiting embodiment. Instead of the above-described metal net, a water diffusion member 14 made by stacking ceramic fibers into a blanket shape is used. Since ceramic fibers withstand high temperatures and are less likely to cause a chemical reaction with water, raw fuel, and the like, ceramic fibers are suitable as a water diffusion member. Since the water introduced from the introduction pipe 8 is vaporized while diffusing between the fibers of the ceramic fibers by the capillary phenomenon, it is possible to directly accelerate the vaporization of the introduced water and stably vaporize the introduced water without accumulating.

In the non-limiting embodiment illustrated in FIGS. 3A, 3B, 3C, and 4, water and raw fuel were introduced into the vaporization chamber by one introduction pipe 8, but water and raw fuel may be introduced via separate introduction pipes. In this case, the introduction pipe which introduces water is connected to the first vaporization chamber 3a, but the introduction pipe which introduces raw fuel may be connected for introducing raw fuel to the second vaporization chamber 3b and the first reforming chamber 4a instead of the first vaporization chamber 3a.

FIGS. 3A, 3B, 3C, and 4 illustrate an example in which the water diffusion members 13 and 14 are provided only in the first vaporization chamber 3a, but the water diffusion members 13 and 14 may extend from the first vaporization chamber 3a to the second vaporization chamber 3b. In this case, the water diffusion members 13 and 14 may be provided to pass under the partition wall 11.

Figure 5:
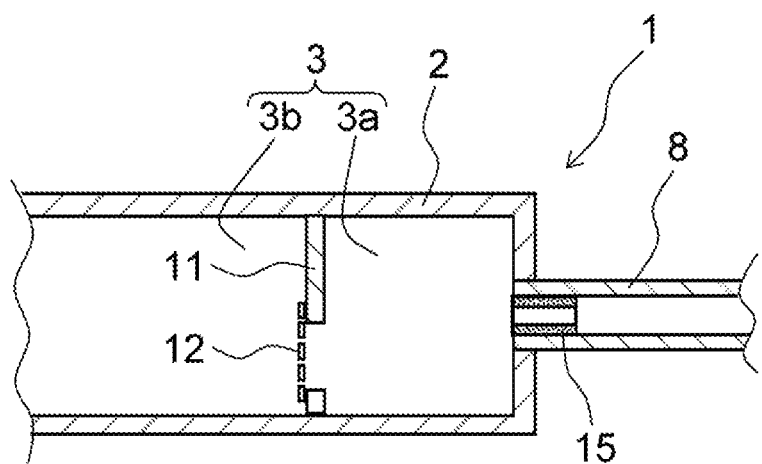
FIG. 5 is a partial cross-sectional view of a reformer of a third non-limiting embodiment.

FIG. 5 is a partial cross-sectional view illustrating the configuration of a reformer of the third non-limiting embodiment, and an atomizing member which is a vaporization accelerating member constituting a vaporization accelerating portion is provided in a portion of the introduction pipe 8 facing the vaporization portion 3 (the first vaporization chamber 3a). The atomizing member 15 has a cylindrical shape and is provided along the inner surface of the introduction pipe 8. As the atomizing member 15, it is possible to use a metal net which is rolled into a cylindrical shape or ceramic fiber molded into a cylindrical shape. The atomizing member 15 is not limited to a cylindrical shape.

The water introduced by the introduction pipe 8 permeates into the atomizing member 15 installed in a portion facing the vaporization portion 3 which is an end of the introduction pipe 8. The raw fuel passes through the center portion of the introduction pipe 8, which is the hollow center portion of the atomizing member 15. The raw fuel flows into the first vaporization chamber 3a while entangling with the water contained in the atomizing member 15 in the form of mist. In this manner, since the water becomes a fine mist and flows into the first vaporization chamber 3a by the atomizing member 15 and flows into the first vaporization chamber 3a together with the raw fuel, it is possible to directly accelerate the vaporization of water and generate steam without the water accumulating at the bottom of the vaporization portion 3.

The atomizing member 15 may be appropriately disposed according to the configuration of the introduction pipe 8. For example, in the case where the introduction pipe 8 is a double pipe of a raw fuel introduction pipe and a water introduction pipe, the atomizing member 15 may be disposed in the water introduction pipe, or, for example, in the case where the raw fuel introduction pipe protrudes from the tip of the water introduction pipe, the atomizing member 15 may be disposed at a position where the water introduced from the water introduction pipe may be atomized at the outer surface of the protruding portion of the raw fuel introduction pipe and at the tip of the water introduction pipe.

Figure 6:
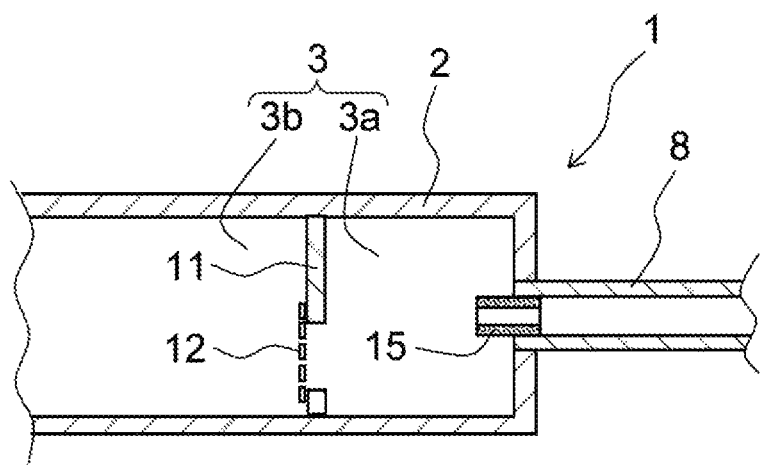
FIG. 6 is a partial cross-sectional view of a reformer of a fourth non-limiting embodiment.

FIG. 6 is a partial cross-sectional view illustrating the configuration of a reformer of the fourth non-limiting embodiment, in which the atomizing member 15 is disposed to protrude into the first vaporization chamber 3a which is the vaporization portion 3. One tip of the cylindrical atomizing member 15 is inserted and fixed in the introduction pipe 8, and the other tip thereof is disposed to protrude into the first vaporization chamber 3a.

In this manner, since the surface area of the atomizing member 15 facing the inside of the first vaporization chamber 3a increases by disposing the atomizing member 15 to protrude into the first vaporization chamber 3a from the tip of the introduction pipe 8, it is possible to more efficiently atomize the introduced water and introduce the atomized water into the first vaporization chamber 3a.

Figure 7:
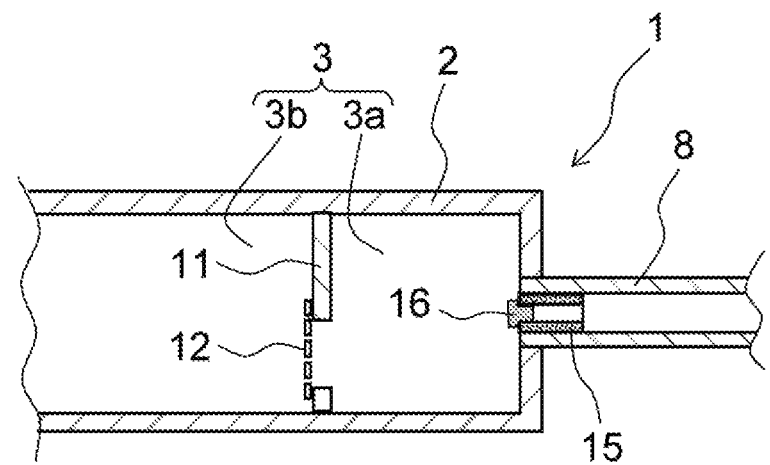
FIG. 7 is a partial cross-sectional view of a reformer of a fifth non-limiting embodiment.

FIG. 7 is a partial cross-sectional view illustrating the configuration of a reformer of a fifth non-limiting embodiment, and a raw fuel diverting member 16 for diverting a flow direction of the raw fuel is provided on the tip side of the atomizing member 15 provided in a cylindrical shape along the inner surface of the introduction pipe 8. The raw fuel diverting member 16 is inserted and fixed in the hole of the cross section of the cylindrical atomizing member 15 on the side of the first vaporization chamber 3a. Like the reformer body 2 and the introduction pipe 8, the raw fuel diverting member 16 is formed of metal having heat resistance and corrosion resistance.

The raw fuel having flowed to the tip of the introduction pipe 8 mostly flows through the hollow center portion of the atomizing member 15, but by providing the raw fuel diverting member 16, the flow in the hollow center portion diverts toward the inner wall of the introduction pipe 8. As a result, a large amount of raw fuel passes through the atomizing member 15 and flows into the first vaporization chamber 3a, and therefore atomization of water may be performed more efficiently. The raw fuel diverting member 16 illustrated in FIG. 7 is defined as a member through which raw fuel does not pass.

Figure 8:
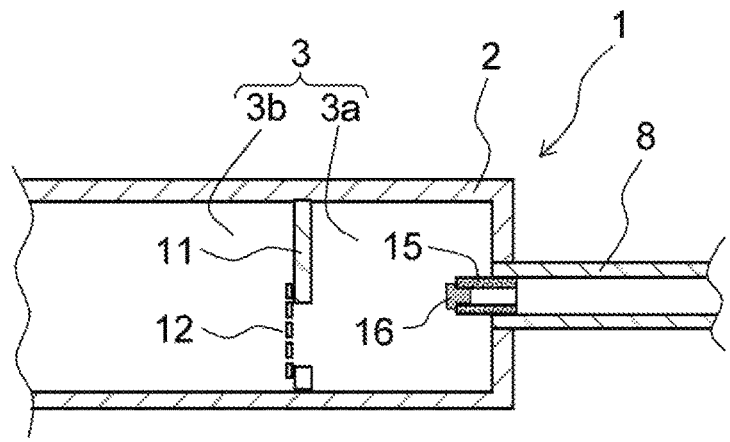
FIG. 8 is a partial cross-sectional view of a reformer of a sixth non-limiting embodiment.

FIG. 8 is a partial cross-sectional view illustrating the configuration of a reformer of a sixth non-limiting embodiment, in which the raw fuel diverting member 16 is attached to the tip of the atomizing member 15 which is disposed to protrude into the first vaporization chamber 3a. Since the raw fuel diverting member 16 diverts the flow in the hollow center portion of the raw fuel toward the inner wall of the introduction pipe 8, a large amount of raw fuel passes through the atomizing member 15 and flows into the first vaporization chamber 3a, and at this time, the water contained in the atomizing member 15 is diffused into the first vaporization chamber 3a in the form of mist. A large amount of raw fuel flows through the atomizing member 15 and flows into the first vaporization chamber 3a, and therefore atomization of water may be performed more efficiently.

In FIGS. 7 and 8, the raw fuel diverting member 16 is inserted and fixed in the hole of the cross section on the side of the first vaporization chamber 3a of the atomizing member 15, but is not limited thereto, and the cross section of the atomizing member 15 on the side of the first vaporization chamber 3a may be covered with a lid-like member formed of a mesh material. Even in this case, the raw fuel may be prevented from passing through the lid-like member, and the flow direction of the raw fuel as a whole may be changed. Therefore, the lid-like member may be used as the raw fuel diverting member 16.

Next, seventh to twelfth non-limiting embodiments will be described in detail with reference to drawings in a similar manner.

FIGS. 9 to 11C are diagrams for describing a configuration of a reformer of the seventh non-limiting embodiment, and FIGS. 12A, 12B, 12C, 13A, 13B, and 13C are diagrams illustrating reformers of eighth and ninth embodiments that are modification examples of the seventh non-limiting embodiment.

Figure 14:
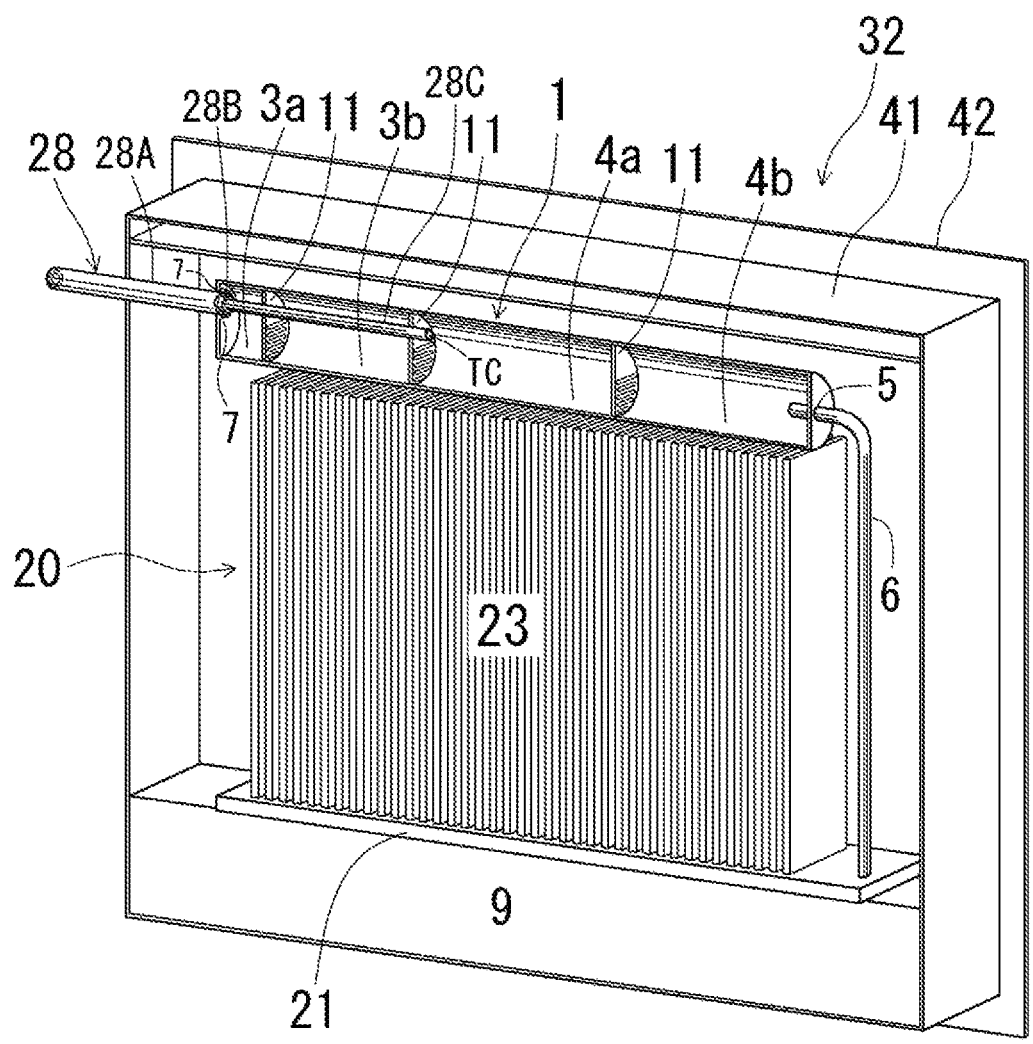
FIG. 14 is a partial cross-sectional view illustrating a connection structure between a raw fuel and water introduction pipe and a reformer body in a fuel cell module of a tenth non-limiting embodiment.
Figure 15A:
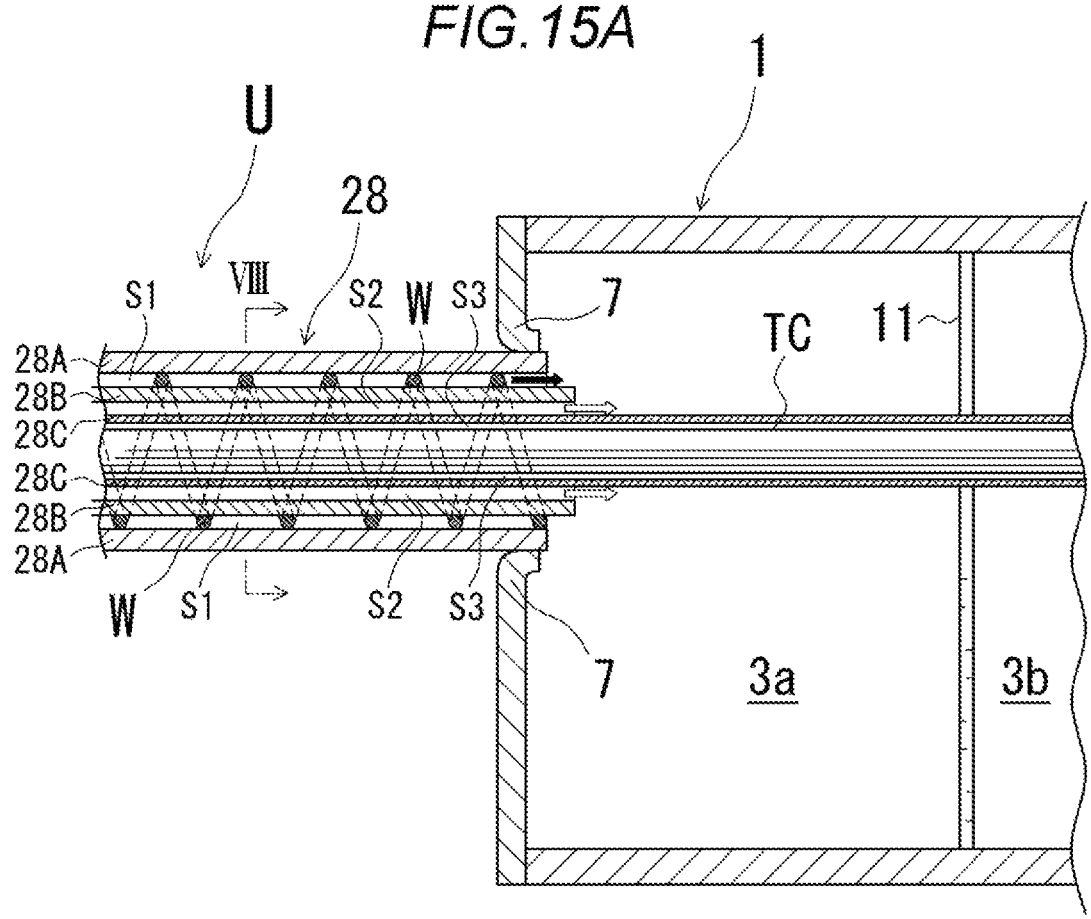
FIG. 15A is a schematic cross-sectional view illustrating a connecting portion between the raw fuel and water introduction pipe and the reformer body in the tenth non-limiting embodiment.
Figure 15B:
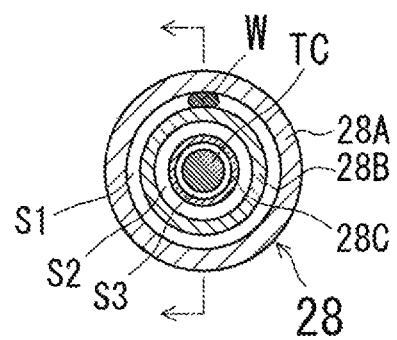
FIG. 15B is a schematic cross-sectional view taken along line VIII of FIG. 15A.
Figure 16:
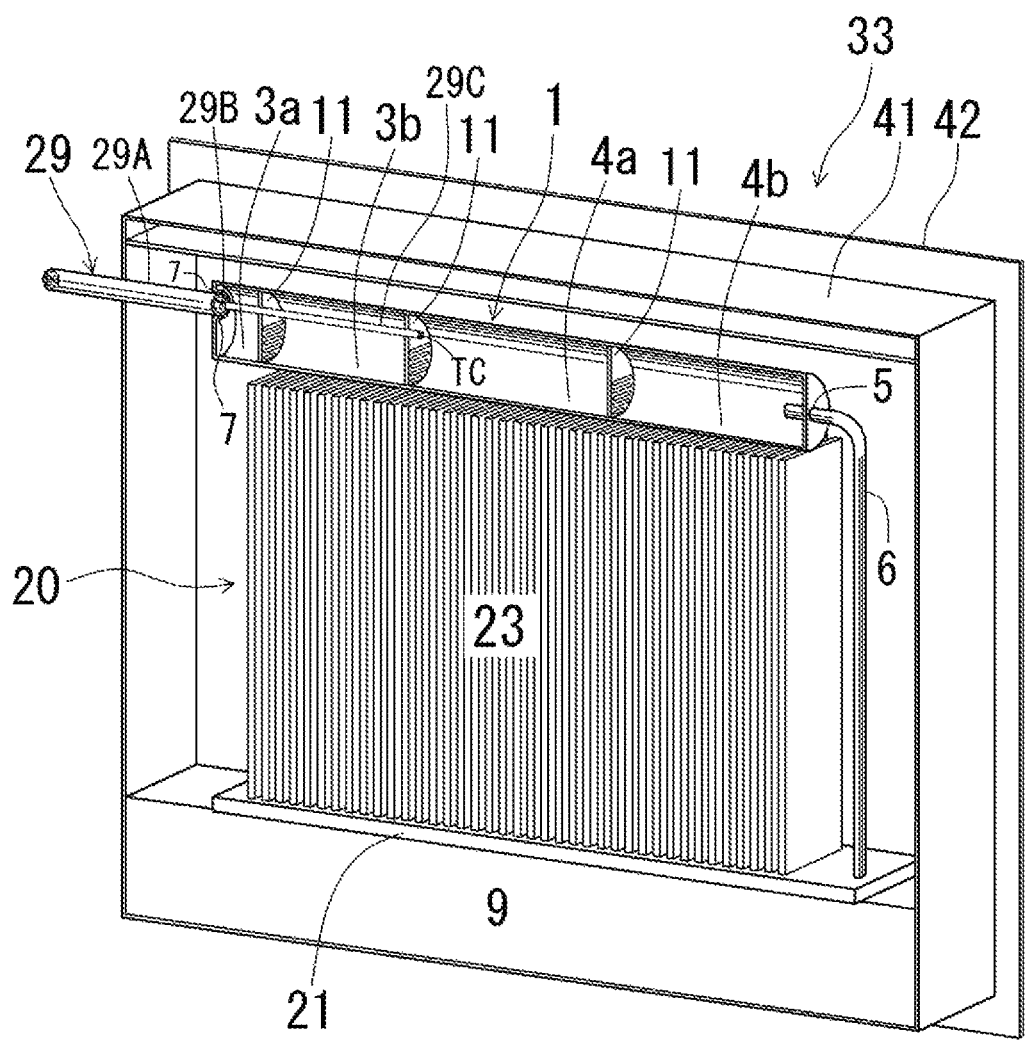
FIG. 16 is a partial cross-sectional view illustrating a connection structure between a raw fuel and water introduction pipe and a reformer body in a fuel cell module of an eleventh non-limiting embodiment.
Figure 17A:
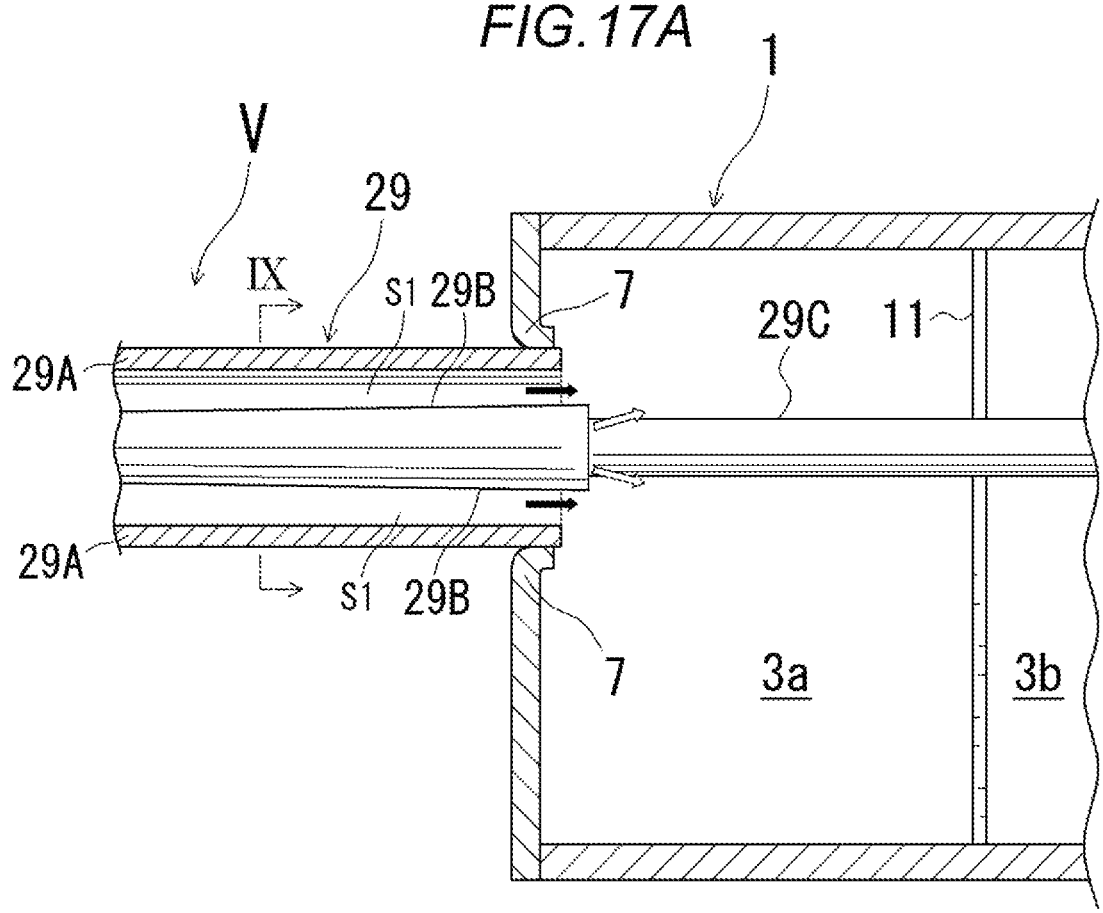
FIG. 17A is a schematic cross-sectional view illustrating a connecting portion between the raw fuel and water introduction pipe and the reformer body in the eleventh non-limiting embodiment.
Figure 17B:
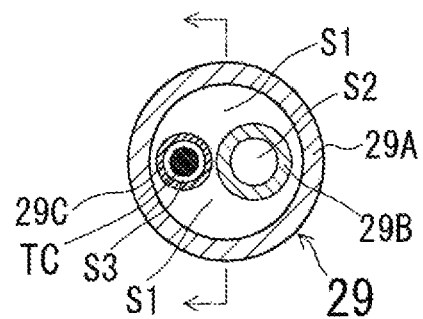
FIG. 17B is a schematic cross-sectional view taken along the line IX of FIG. 17A.

FIGS. 14, 15A, and 15B are diagrams illustrating the reformer of a tenth non-limiting embodiment, and FIGS. 16, 17A, and 17B are diagrams illustrating a reformer of an eleventh non-limiting embodiment.

Figure 18A:
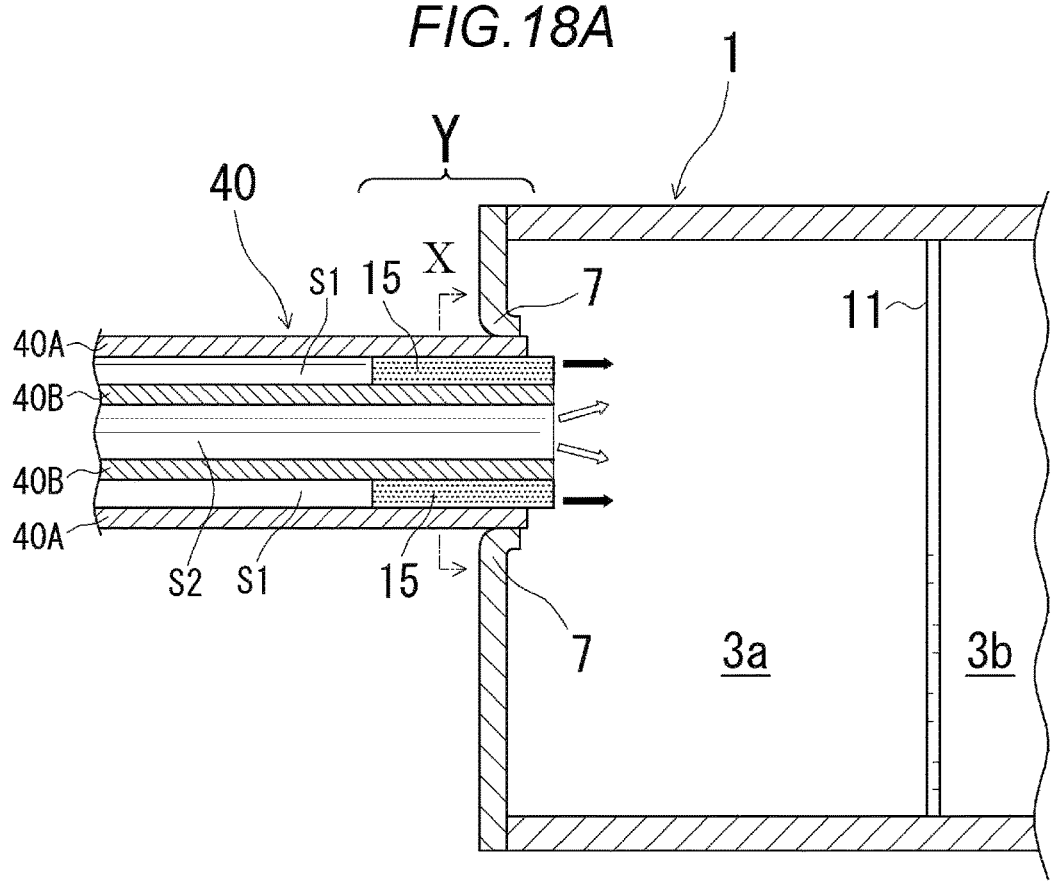
FIG. 18A is a schematic cross-sectional view illustrating a connecting portion between a raw fuel and water introduction pipe and a reformer body in a twelfth non-limiting embodiment.
Figure 18B:
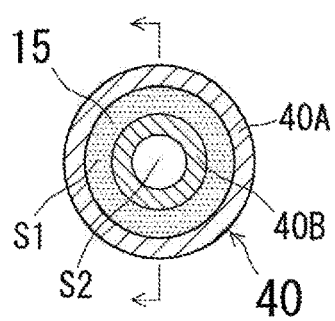
FIG. 18B is a schematic cross-sectional view taken along the line X of FIG. 18A.

FIGS. 18A and 18B are diagrams illustrating a reformer of a twelfth non-limiting embodiment that is another example of the seventh non-limiting embodiment.

Figure 9:
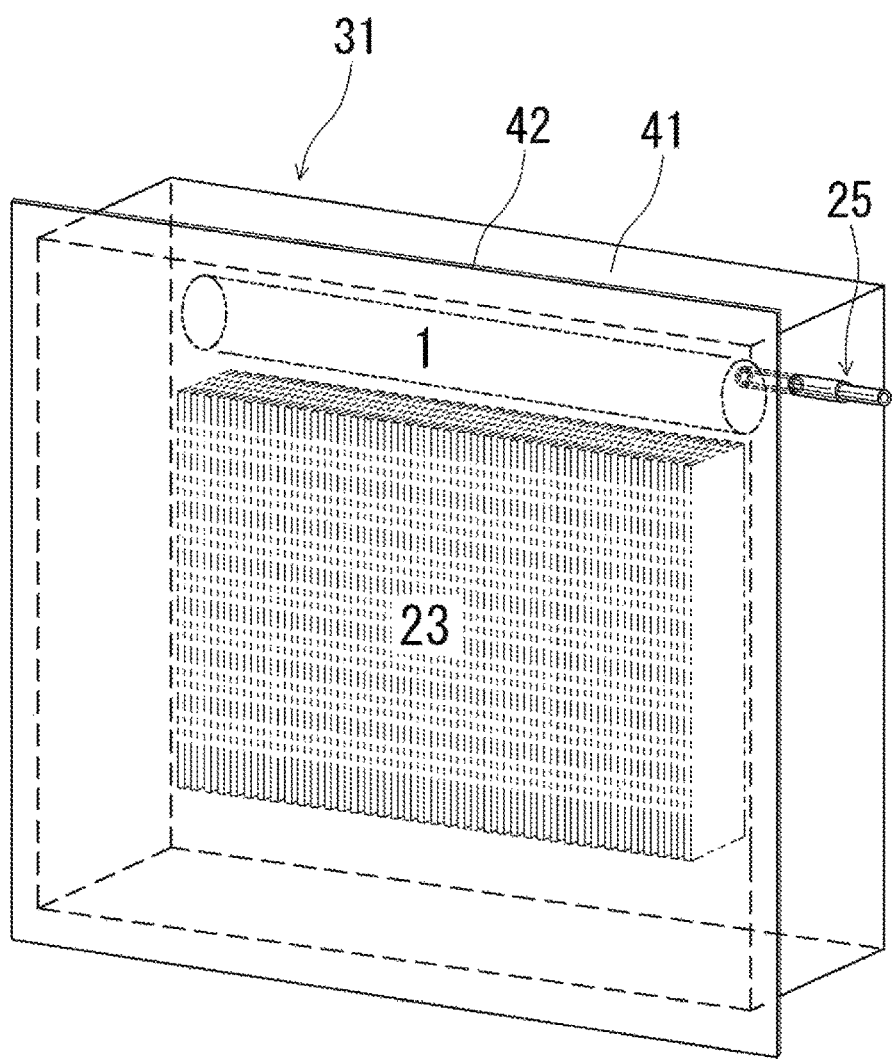
FIG. 9 is an external perspective view illustrating a connection state of a raw fuel and water introduction pipe to a housing in a fuel cell module of a non-limiting embodiment.
Figure 10:
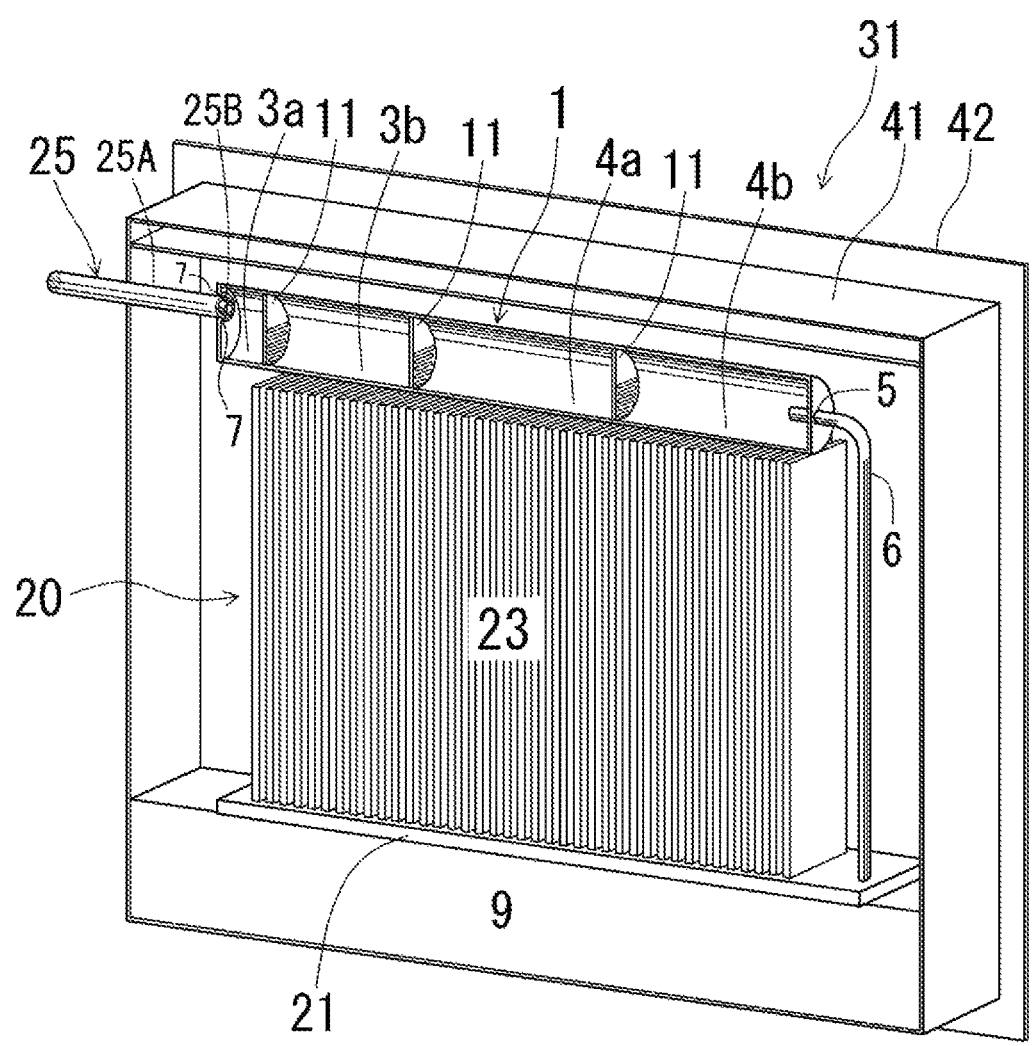
FIG. 10 is a partial cross-sectional view illustrating a connection structure between a raw fuel and water introduction pipe and a reformer body in a fuel cell module of a seventh non-limiting embodiment.

A fuel cell module 31 used in the fuel cell apparatus of the seventh non-limiting embodiment illustrated in FIG. 9 is a solid oxide fuel cell (SOFC) module. A cell stack apparatus 20 including the cell stack 23 and the reformer 1 as illustrated in a partial cross-sectional view (cut model) of FIG. 10 is housed inside a housing 41, and an opening of the housing (accommodating space) is hermetically closed with a lid 42. It is assumed that the housing 41 is formed in a rectangular shape elongated along the arrangement direction of the fuel cells (cell stack 23), and the length direction (longitudinal direction) of the reformer 1 in the longitudinal direction of the housing 41 along the arrangement direction of the fuel cells is referred to as a front-back direction (front-deep direction). Therefore, in FIG. 9, the right side in the drawing is the front side of the module, and in FIG. 10, the left side in the drawing (on the opposite side) corresponds to the front side of the module.

Then, in FIG. 9, the raw fuel and water introduction pipe 25 which introduces raw fuel such as natural gas (including gaseous raw fuel gas) and water for raw fuel reforming to the reformer 1 of the cell stack apparatus 20 is disposed on the front (the right side in the drawing) side surface (the left side in the drawing of FIG. 10) of the housing 41 in FIG. 9. In some cases, a thermocouple (not illustrated) for measuring the temperature inside the reformer 1 is inserted inside the reformer 1 in the same axial direction as the raw fuel and water introduction pipe 25.

The internal structure of the fuel cell module 31 of the seventh non-limiting embodiment will be described with reference to FIG. 10.

The cell stack apparatus 20 described in FIG. 1 is housed in the central portion of the housing 41. On the lower side of the cell stack apparatus 20, an internal heat insulating material (bottom heat insulating material) 9 is disposed. Since the cell stack apparatus 20 has the same configuration as that of the cell stack apparatus 10 illustrated in FIG. 1, the description of the same portion will be omitted.

The shape of the cell stack 23 is not limited to a row shape, and a cell stack apparatus including a cell stack of another arrangement may also be used. The housing may also be a rectangular parallelepiped shape, a cylindrical shape, a cubic shape, a prismatic shape, or the like according to the shape (appearance) of the cell stack apparatus.

The reformer 1 (also referred to as the reformer body 2 which is a housing) of FIG. 10 is illustrated by cutting out a part thereof so that the interior may be seen. In this example, the reformer 1 (or the reformer body 2) as a whole is a hollow straight cylindrical shape (straight pipe shape) corresponding to a row shape of the cell stack 23.

Like the reformers of the first to sixth non-limiting embodiments, the interior of a hollow cylindrical reformer body (2) is divided into the vaporization portion 3 and the reforming portion 4 by a plurality of partition walls 11. As illustrated in FIGS. 3 and 4, to cover at least the lower portion (bottom side) of the first vaporization chamber 3a and the second vaporization chamber 3b, the water diffusion members 13 and 14 formed of ceramic fibers or the like may be disposed along the inner surfaces of respective vaporization chambers 3a and 3b. The reforming portion 4 includes the first reforming chamber 4a and the second reforming chamber 4b which react the steam generated in the second vaporization chamber 3b with the raw fuel for reforming to generate a reformed gas. The reforming portion 4 may be a reforming portion including one room (chamber) without being divided by the partition wall 11. Except for the above points, the rest of the reforming portion is the same as the reformers of the first to sixth non-limiting embodiments.

Next, in the seventh non-limiting embodiment, the raw fuel and water introduction pipe 25 which introduces raw fuel such as natural gas and water for raw fuel reforming into the reformer 1 will be described in detail.

Figure 11A:
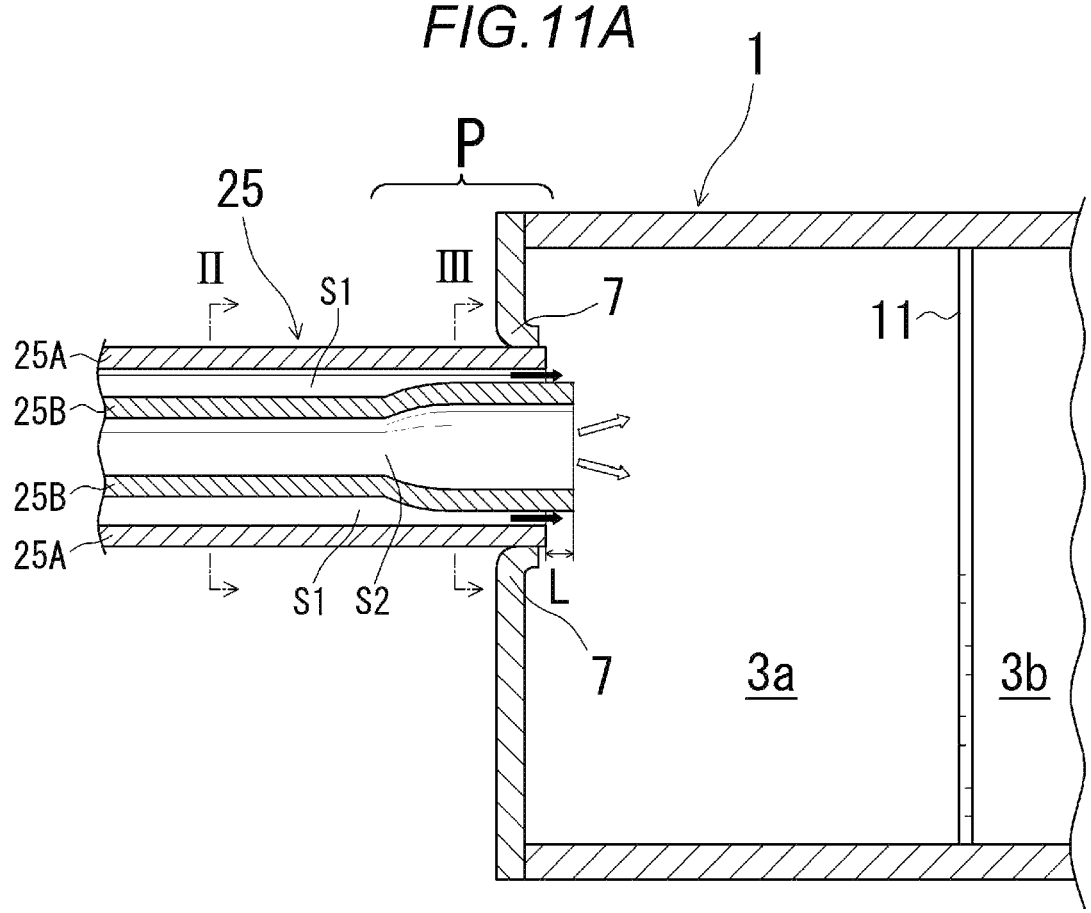
FIG. 11A is a schematic cross-sectional view illustrating a connecting portion between the raw fuel and water introduction pipe and the reformer body in the seventh non-limiting embodiment.
Figure 11B:
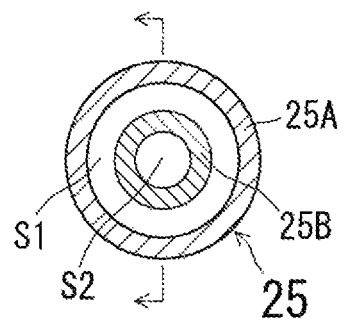
FIG. 11B is a schematic cross-sectional view taken along the line II of FIG. 11A.
Figure 11C:
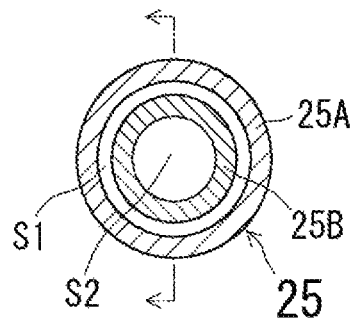
FIG. 11C is a schematic cross-sectional view taken along the line III in FIG. 11A.

As illustrated in FIGS. 11A, 11B, and 11C, the raw fuel and water introduction pipe 25 has a double pipe structure composed of a large-diameter outer pipe 25A constituting an outer circumference and a small-diameter inner pipe 25B constituting an inner circumference. A space S1 extending in the axial direction of the pipe between the outer pipe 25A and the inner pipe 25B, which are independent of each other, is a water passage through which water (indicated by solid arrows) flows, and a space S2 in the axial direction inside the inner pipe 25B is a raw fuel passage through which raw fuel (gas: indicated by hollow arrows) flows.

All fluids such as a gas (raw fuel) and water flow from the introduction side (the upstream side on the left side in the drawing) toward the introduction port 7 (the downstream side on the right side in the drawing) of the reformer 1 in the direction indicated by the arrows and are discharged (introduced) into the reformer 1 from each discharge port formed at the end opening of each pipe.

Meanwhile, when a large amount of water is instantaneously introduced into the raw fuel and water introduction pipe 25 due to fluctuation in the pump output or the like, the introduced water flows through the water introduction pipe as it is, and therefore a relatively large amount of water is instantaneously introduced into the vaporization portion (vaporization chamber 3a). As a result, the temperature of the vaporization portion 3 instantaneously decreases, the efficiency of vaporization may be deteriorated, and the reforming reaction in the reformer 1 may become unstable.

Therefore, the water passage (the space S1 extending between the outer pipe 25A and the inner pipe 25B) in the present non-limiting embodiment constitutes the vaporization accelerating portion and includes a flow suppressing portion (portion P in the raw fuel and water introduction pipe 25 in FIG. 11A) which suppresses the flow of water in the axial direction of the water passage. With this configuration, even when a large amount of water is instantaneously introduced into the water introduction pipe, the introduced water is suppressed from flowing through the water introduction pipe as it is. In other words, since it is possible to suppress the instantaneous introduction of a relatively large amount of water into the vaporization portion, the amount of water introduced into the vaporization portion is suppressed and eventually, the vaporization of water may be accelerated and the steam-reforming of the raw fuel may be performed stably. That is, the flow suppressing portion constituting the vaporization accelerating portion may indirectly accelerate the vaporization in the vaporization portion.

Here, as illustrated in FIGS. 11B and 11C, in the space S1 constituting the water passage, an area (cross-sectional area of the water passage) occupied by the space S1 in the cross section at the downstream side end position (position III on the right in the drawing: FIG. 11C) of the passage is smaller than an area (cross-sectional area of the water passage) occupied by the space S1 in the cross section of the normal diameter portion of the pipe (position II on the left side in the drawing: FIG. 11B) on the upstream side of the passage. This reduced area (the enlarged diameter portion P of the inner pipe 25B) of the cross-sectional area of the water passage is a "flow suppressing portion" that suppresses the flow of water in the axial direction (flow direction of water indicated by solid arrows in the drawing) of the water passage.

In the seventh non-limiting embodiment, a flow suppressing portion P is disposed at a downstream side end of the water passage in the flow direction of water as described above. With this configuration, it is possible to suppress the flow of water introduced into the water introduction pipe in the vicinity of the discharge port. Therefore, it is possible to effectively suppress the instantaneous introduction of a relatively large amount of water into the vaporization portion and indirectly accelerate the vaporization in the vaporization portion.

In the seventh non-limiting embodiment, as described above, the cross-sectional area of the passage of the flow suppressing portion P is smaller than the cross-sectional area of the water passage on the upstream side in the flow direction of water from the flow suppressing portion P. With this configuration, since the cross-sectional area of the passage of the flow suppressing portion P is small, that is, the distance between the outer pipe 25A and the inner pipe 25B becomes short, the surface tension generated with water increases, and the flow of water is suppressed. As a result, it is possible to further suppress the instantaneous introduction of a relatively large amount of water into the vaporization portion and indirectly accelerate the vaporization in the vaporization portion.

In the seventh non-limiting embodiment, in which one of the water introduction pipe and the raw fuel introduction pipe is disposed inside the other pipe, the "flow suppressing portion" may be provided by making the diameter in the portion of at least one of the water introduction pipe and the raw fuel introduction pipe corresponding to the flow suppressing portion different from the diameter of at least one of the water introduction pipe and the raw fuel introduction pipe on the upstream side in the flow direction of water or raw fuel from the flow suppressing portion P. With this configuration, it is possible to easily manufacture a water introduction pipe including a flow suppressing portion by changing one of the diameters of the pipes.

Figure 12A:
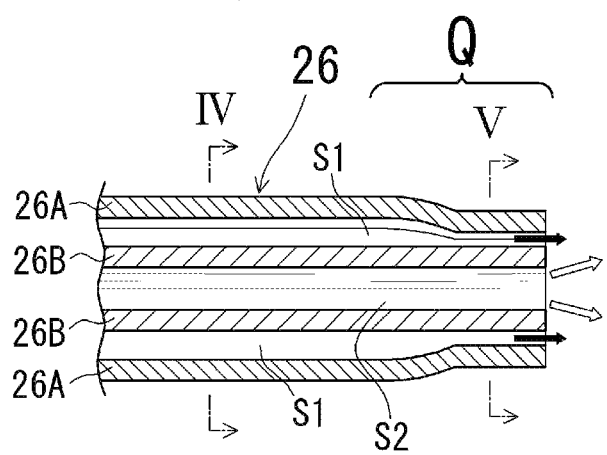
FIG. 12A is a schematic cross-sectional view illustrating a connecting portion between a raw fuel and water introduction pipe and a reformer body in an eighth non-limiting embodiment.
Figure 12B:
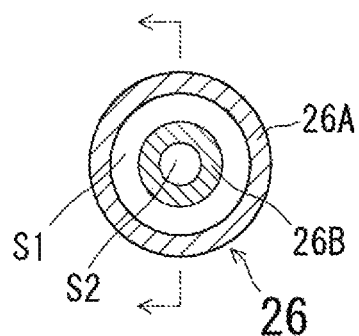
FIG. 12B is a schematic cross-sectional view taken along the line IV of FIG. 12A.
Figure 12C:
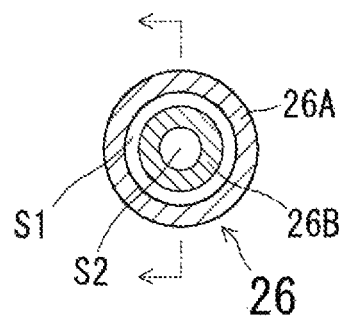
FIG. 12C is a schematic cross-sectional view taken along the line V of FIG. 12A.

In the seventh non-limiting embodiment illustrated in FIG. 11A, the diameter of a downstream side end of the inner pipe 25B on the inner side of the double pipe is expanded to form the flow suppressing portion P of the water passage, but the method of forming the flow suppressing portion in the water passage is not limited thereto. For example, as illustrated in FIGS. 12A, 12B, and 12C as the eighth non-limiting embodiment, in a raw fuel and water introduction pipe 26 having a double pipe structure, the downstream side end of the large-diameter outer pipe 26A may be reduced in diameter in the direction of the small-diameter inner pipe 26B (inner diameter side) constituting the inner circumference to form a flow suppressing portion Q.

Figure 13A:
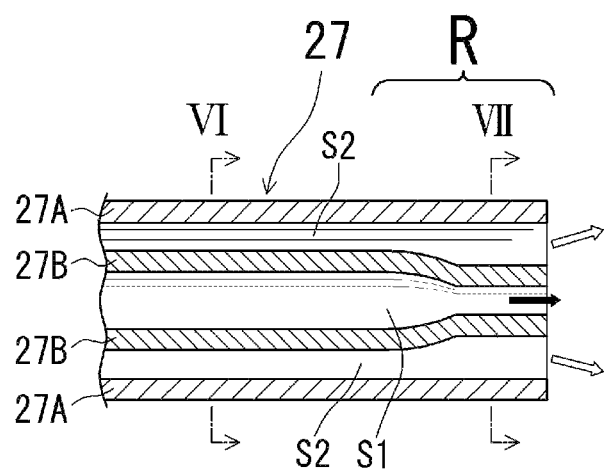
FIG. 13A is a schematic cross-sectional view illustrating a connecting portion between a raw fuel and water introduction pipe and a reformer body in a ninth non-limiting embodiment.
Figure 13B:
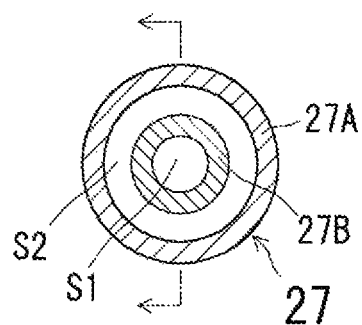
FIG. 13B is a schematic cross-sectional view taken along the line VI of FIG. 13A.
Figure 13C:
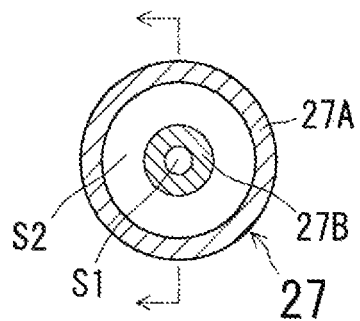
FIG. 13C is a schematic cross-sectional view taken along the line VII of FIG. 13A.

For example, as illustrated in FIGS. 13A, 13B, and 13C as the ninth non-limiting embodiment, contrary to the raw fuel and water introduction pipes 25 and 26, a water passage (space S1) may be formed inside a small-diameter inner pipe 27B. In this manner, in a raw fuel and water introduction pipe 27 in which the raw fuel passage (space S2) is formed in the axial direction of the pipe between the inner pipe 27B and the large-diameter outer pipe 27A forming the outer circumference, the diameter of the pipe (position VII on the right side in the drawing: FIG. 13C) at a downstream side end of the inner pipe 27B through which the water flows is reduced to be smaller than the diameter of the pipe (position VI on the left side in the drawing: FIG. 13B) on the upstream side in the water flow direction to form a flow suppressing portion R.

Focusing on the raw fuel passage, in the inner pipe 25B through which the raw fuel flows corresponding to the flow suppressing portion P in the seventh non-limiting embodiment, the cross-sectional opening area (cross-sectional area of the raw fuel passage) of the space S2 on the downstream side end (position III on the right side in the drawing: FIG. 11C) is larger than the cross-sectional opening area (cross-sectional area of the raw fuel passage) of the space S2 in the normal diameter portion (position II on the left side in the drawing: FIG. 11B) of the pipe on the upstream side of the passage. With this configuration, since the internal pressure of the raw fuel (gas) is released and the raw fuel is easily diffused into the reformer, it is possible to accelerate the reforming reaction.

As illustrated in the example of FIG. 13A, in the raw fuel and water introduction pipe 27 in which the water passage (space S1) is formed inside the inner pipe 27B and the raw fuel passage (space S2) is formed in the axial direction of the pipe between the inner pipe 27B and the outer pipe 27A, the cross-sectional opening area (cross-sectional area of the raw fuel passage) of the space S2 at the downstream side end (position VII on the right in the drawing: FIG. 13C) of the outer pipe 27A is made larger than the cross-sectional opening area (cross-sectional area of the raw fuel passage) of the space S2 at the normal diameter portion (position VI on the left side in the drawing: FIG. 13B) of the pipe on the upstream side of the passage. Also in this case, the same effect as described above may be obtained.

For example, as illustrated enlarged in FIG. 11A, a connection portion between the raw fuel and water introduction pipes 25, 26, and 27 and the body (2) of the reformer 1 is fixed to the introduction port 7 by welding, and with respect to the outer pipe 25A constituting the water passage, an end (gas discharge opening on the right side in the drawing) on the downstream side of the inner pipe 25B constituting the raw fuel passage protrudes toward the inner side (the right side in the drawing) of the reformer 1 body from the end (water discharge port) on the downstream side of the outer pipe 25A. A protrusion amount of the end of the inner pipe 25B (raw fuel passage) toward the inner side (axial direction) with respect to the end of the outer pipe 25A (water passage) is represented by L (unit: mm) in the drawing. In this example, a length L, which is the protrusion amount toward the inner side of the end of the inner pipe 25B, is set to about 1.0 to 15.0 mm.

As illustrated in FIG. 11A, the connection (fixation) of the raw fuel and water introduction pipe 25 to the reformer 1 body is achieved by inserting the raw fuel and water introduction pipe 25 having a diameter slightly smaller than the opening in the opening of the introduction port 7 formed in an L-shaped cross section with the edge (the inner edge) of the tip thereof bent toward the inside of the body of the reformer 1 in the cross section. A portion between the inner circumferential edge of the introduction port 7 and the outer circumferential surface of the raw fuel and water introduction pipe 25 is sealed and fixed by welding (not illustrated).

Next, the internal structure of a fuel cell module 32 of the tenth non-limiting embodiment will be described with reference to FIGS. 14, 15A and 15B. In the fuel cell module 32, the configurations of the cell stack 23, the reformer 1 (reformer body 2), the manifold 21, and the like of the cell stack apparatus 20 are the same as those of the fuel cell module 31 of the ninth non-limiting embodiment. Only the differences from the structure of the ninth non-limiting embodiment will be described below.

As illustrated in FIGS. 15A and 15B, a raw fuel and water introduction pipe 28 of the present non-limiting embodiment includes a large-diameter outer pipe 28A constituting the outer circumference and a small-diameter sheath pipe 28C constituting the innermost circumference. A medium-diameter inner pipe 28B extending independently along the axial direction of the pipe is inserted into the space in the diametric direction between the outer pipe 28A and the small-diameter sheath pipe 28C. In this manner, the raw fuel and water introduction pipe 28 has a triple pipe structure. A water passage through which water (indicated by a solid arrow) flows is formed in the space S1 in the axial direction between the outer pipe 28A and the inner pipe 28B, and a raw fuel passage through which raw fuel (gas: indicated by hollow arrows) flows is formed in the space S2 in the axial direction between the inner pipe 28B and the small-diameter sheath pipe 28C. A thermocouple TC for measuring the temperature inside the reforming portion of the reformer 1 is inserted in a space S3 in the axial direction inside the sheath pipe 28C which is the innermost (inner diameter side). The sheath pipe 28C may be disposed in the axial direction of the raw fuel and water introduction pipe 28 without coming into contact with either the outer pipe 28A or the inner pipe 28B.

By adopting a triple pipe structure composed of the outer pipe 28A, the inner pipe 28B, and the sheath pipe 28C, the raw fuel and water introduction pipe 28 is connected only by the outer pipe 28A at the outermost circumference with the reformer 1, and therefore easy connection and improved production efficiency are achieved. Since it is possible to suppress the heat drawing from the sheath pipe 28C to the outside of the reformer 1, it is possible to suppress the temperature decrease inside the reformer 1.

In the tenth non-limiting embodiment illustrated in FIG. 15A, there is provided a flow resisting member formed of a helical member W or the like, inserted in the space S1 (water passage) in the axial direction formed between the outer pipe 28A and the inner pipe 28B, the flow resisting member extending, for example, in the axial direction of the water passage. The entire portion of the raw fuel and water introduction pipe 28 illustrated in the drawing becomes a flow suppressing portion U.

That is, since the flow of water may be suppressed by providing a flow resisting member inserted in the axial direction of the water passage, it is possible to suppress the instantaneous introduction of a relatively large amount of water into the vaporization portion, thus to indirectly accelerate the vaporization in the vaporization portion, and to perform the steam-reforming of the raw fuel stably. Other examples of the flow resisting member include a mesh heat resistant member.

In the tenth non-limiting embodiment, as described above, the flow resisting member such as the helical member W is disposed in the water passage (space S1) between the outer pipe 28A and the inner pipe 28B. That is, by providing the flow resisting member, water is diffused in a direction orthogonal to the flow direction of water and the inner pipe 28B to be the raw fuel passage (space S2) is disposed in the water passage. As a result, since surface tension of water is generated between the outer surface of the inner pipe 28B and the inner surface of the outer pipe 28A, and the surface tension increases due to the contact with the flow resisting member (helical member W) inserted between the pipe and the pipe, it is possible to further suppress the flow of water.

As in the tenth non-limiting embodiment, when the flow resisting member is the helical member W described above, water flows spirally along the helical member W. As a result, the passage length of the water passage may be made substantially longer, and further, the helical member W and the water come into contact with each other to generate surface tension also with the helical member W. Therefore, the surface tension is increased, and the flow of water may be further suppressed.

Next, the internal structure of a fuel cell module 33 of the eleventh non-limiting embodiment will be described with reference to FIGS. 16, 17A, and 17B. Also, in this fuel cell module 33, the configurations of the cell stack 23, the reformer 1 (reformer body 2), the manifold 21, and the like of the cell stack apparatus 20 are the same as those of the fuel cell modules 31 and 32 of the ninth and tenth non-limiting embodiments.

The fuel cell module 33 of the eleventh non-limiting embodiment is different from that of the tenth non-limiting embodiment in that a raw fuel and water introduction pipe 29 which introduces the raw fuel and water into the reformer 1 (the reform body 2 which is the housing) has a structure in which a medium-diameter inner pipe 29B constituting the raw fuel passage and a small-diameter thermocouple sheath pipe 29C for inserting the thermocouple TC therein are inserted in parallel with each other independently inside a large-diameter outer pipe 29A constituting the outer circumference.

Like the above-described tenth non-limiting embodiment, the inner pipe 29B (raw fuel passage) illustrated in FIG. 17A has a tapered shape in which the diameter of the pipe is gradually enlarged from the upstream side (position IX on the left side in the drawing: FIG. 17B) in the flow direction of the raw fuel to the downstream side end (discharge port for raw fuel on the right side in the drawing) on the discharge side of the raw fuel. As a result, in the water passage (space S1) formed between the outer pipe 29A whose diameter is not changed in the axial direction and the inner pipe 29B, the area (cross-sectional area of the water passage) occupied by the space S1 in the cross section of the water discharge port position (position of the introduction port 7 on the right side in the drawing) located at the downstream side end of the passage is smaller than the area (cross-sectional area of the water passage) occupied by the space S1 in the cross section on the upstream side (position IX on the left side in the drawing) of the passage.

That is, also in the eleventh non-limiting embodiment, like the tenth non-limiting embodiment, the downstream side end (the entire portion of the raw fuel and water introduction pipe 29 in the drawing) of the water passage becomes a flow suppressing portion V due to the enlarged diameter of the inner pipe 29B.

Instead of enlarging or reducing the diameter of the vicinity of the outlet (discharge port) of the raw fuel and water introduction pipe or disposing the helical member or the like within the water passage, the atomizing member 15 illustrated in the third and fourth non-limiting embodiments above may be used. That is, a raw fuel and water introduction pipe 40 of the twelfth non-limiting embodiment illustrated in FIGS. 18A and 18B has a double pipe structure including a large-diameter outer pipe 40A constituting the outer circumference and a small-diameter inner pipe 40B constituting the inner circumference. The atomizing member 15 which atomizes the flowing water is disposed in a water passage formed in the space S1 between the outer pipe 40A and the inner pipe 40B.

Since the atomizing member 15 functions as a flow resisting member which suppresses the flow of water in the axial direction, a flow restriction portion V similar to the portions P, Q, and R previously described is formed at the end of the raw fuel and water introduction pipe 40. With this configuration, it is possible to achieve the same effects as those of the reformers of the seventh to eleventh non-limiting embodiments. The atomizing member, the flow resisting member, and the above-described water diffusion member may be used in combination with each other and may be disposed at once with the flow suppressing portion (increasing, reducing or the like of the diameter of the pipe).

Figure 19:
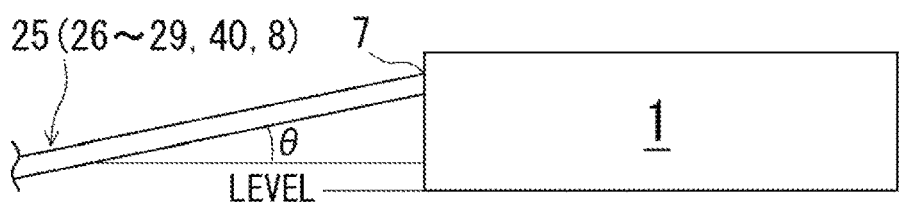
FIG. 19 is a diagram for describing a connection state of the raw fuel and water introduction pipe to the reformer body.

On the other hand, as illustrated in FIG. 19, the raw fuel and water introduction pipe (8, 25 to 29, 40, and the like, representatively 25) illustrated in each non-limiting embodiment may be connected to the reformer 1 to be inclined upward (angle θ) with respect to the horizontal plane (LEVEL) from the upstream side (the introduction source side on the left side in the drawing) to the downstream side (the introduction port side on the right side in the drawing). According to this configuration, since the discharge port of water is directed upward, flow of water may be suppressed, and instantaneous introduction of a relatively large amount of water into the vaporization portion may be suppressed. As a result, vaporization in the vaporization portion may be accelerated indirectly by suppressing the instantaneous fluctuation of the amount of water introduced into the vaporization portion. Therefore, the steam-reforming of the raw fuel may be performed stably.

In each of the above-described non-limiting embodiments, an example is illustrated in which raw fuel and water are simultaneously introduced from a single introduction port through the raw fuel and water introduction pipe arranged into one, but raw fuel and water may also be introduced separately by using single pipes without a multiple pipe structure. In that case, a flow suppressing portion similar to the above-described flow suppressing portion may be provided or a flow suppressing member may be disposed at the downstream side end (the end) of the pipe for introducing water.

Next, the fuel cell modules 30 to 33 of the respective non-limiting embodiments are incorporated in the fuel cell apparatus as follows.

For example, as illustrated in FIG. 20, a fuel cell apparatus 50 is configured so as to house the above-described fuel cell module 30 (including 31 to 33) in an exterior case constituted by respective support columns 51 and exterior plates (not illustrated). Inside the exterior case, in addition to the illustrated fuel cell module 30, auxiliary machines such as a heat accumulation tank, a power conditioner for introducing generated electric power outside, a pump, a controller, and the like are disposed.

In such fuel cell apparatus 50, by housing the compact fuel cell module 30, a heat exchanger, various auxiliary machines, and the like in one exterior case, the height and width of the exterior case is reduced, thereby downsizing the entire fuel cell apparatus.

The invention may be embodied in other specific forms without departing from the spirit or essential characteristics thereof. The present non-limiting embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

REFERENCE SIGNS LIST

1: Reformer
2: Reformer body
3: Vaporization portion
3a: First vaporization chamber
3b: Second vaporization chamber
4: Reforming portion
4a: First vaporization chamber
4b: Second vaporization chamber
5: Reformed gas delivery port
6: Reformed gas supply pipe
7: Introduction port
8: Introduction pipe
9: Heat insulating material
10: Cell stack apparatus
11: Partition wall
12: Flow permission portion
13: Water diffusion member
14: Water diffusion member
15: Atomizing member
16: Raw fuel diverting member
20: Cell stack apparatus
21: Manifold
22: Cell (fuel cell)
23: Cell stack
24: Combustion portion
25, 26, 27, 28, 29: Raw fuel and water introduction pipe
30, 31, 32, 33, 40: Fuel cell module
50: Fuel cell apparatus
C: Central axis
P, Q, R, U, V, Y: Flow suppressing portion
W: Helical member (flow resisting member)
S1: Water passage
S2: Raw fuel passage

What is claimed is:
1. A reformer, comprising:
a reformer body, which has a cylindrical shape and extends horizontally, configured to use raw fuel and water to perform a reforming reaction, the reformer body comprising:
a vaporization portion configured to generate steam from the water, and
a reforming portion configured to react the steam, generated in the vaporization portion, with the raw fuel to generate a reformed gas;
a raw fuel introduction pipe which is connected to the reformer body and is configured to introduce the raw fuel into the reformer body; and a water introduction pipe connected to the reformer body and comprising a water passage which is configured to introduce the water into the reformer body; and a vaporization accelerating portion, the vaporization accelerating portion configured to accelerate vaporization of water in the vaporization portion;

wherein the raw fuel introduction pipe is located inside the water introduction pipe, the water passage comprises a flow suppressing portion which is configured to suppress the water from flowing in an axial direction of the water passage, the flow suppressing portion constituting the vaporization accelerating portion, the flow suppressing portion comprises a flow resisting member inserted in the axial direction of the water passage, and the flow resisting member is disposed between the raw fuel introduction pipe and the water introduction pipe.

2. The reformer according to claim 1, wherein
the vaporization accelerating portion comprises an atomizing member which is disposed in a portion of the water introduction pipe facing the vaporization portion, the atomizing member configured to atomize the water introduced into the vaporization portion.

3. The reformer according to claim 2, wherein
the atomizing member protrudes into the vaporization portion from a tip of the water introduction pipe.

4. The reformer according to claim 2, wherein
the atomizing member comprises a fiber material formed of an inorganic material.

5. The reformer according to claim 1, wherein
the flow suppressing portion is located at a downstream side end of the water passage in a flow direction of the water.

6. The reformer according to claim 1, wherein
a cross-sectional area in a portion of the water passage corresponding to the flow suppressing portion is smaller than a cross-sectional area of the water passage corresponding to an upstream side, in the flow direction of the water, from the flow suppressing portion.

7. The reformer according to claim 6, wherein
a diameter in a portion of at least one of the water introduction pipe and the raw fuel introduction pipe corresponding to the flow suppressing portion is different than a diameter of the at least one of the water introduction pipe and the raw fuel introduction pipe corresponding to the upstream side, of the flow direction of the water or the raw fuel, from the flow suppressing portion.

8. The reformer according to claim 7, wherein
a cross-sectional area in a portion of the raw fuel passage corresponding to the flow suppressing portion is larger than a cross-sectional area of the raw fuel passage corresponding to an upstream side, of a flow direction of the raw fuel, from the flow suppressing portion.

9. The reformer according to claim 1, further comprising:
a sheath pipe comprising a thermocouple inserted therein, the thermocouple configured to measure an internal temperature of the reformer body, wherein
the sheath pipe is located inside the water introduction pipe or the raw fuel introduction pipe, and
the sheath pipe is disposed in the axial direction of the water introduction pipe and the raw fuel introduction pipe without contacting either the water introduction pipe or the raw fuel introduction pipe.

10. The reformer according to claim 1, wherein
the flow resisting member comprises a heat resistant mesh.

11. The reformer according to claim 1, wherein
the flow resisting member comprises a helical member that is coaxial with the raw fuel introduction pipe and the water introduction pipe.

12. The reformer according to claim 1, wherein
an end of the raw fuel introduction pipe protrudes toward an inner side of the reformer body from an end of the water introduction pipe.

13. A cell stack apparatus, comprising:
the reformer according to claim 1 connected to a manifold and disposed above a cell stack;
the cell stack comprising a plurality of fuel cells and a gas passage penetrating into each fuel cell of the plurality of fuel cells in a longitudinal direction, the each fuel cell configured to generate electric power with a fuel gas and an oxygen-containing gas, and to burn the fuel gas not used for power generation on an upper end side of the cell stack; and
the manifold which communicates with the gas passage and is configured to introduce the fuel gas into the gas passage.

14. A fuel cell module, comprising:
the cell stack apparatus according to claim 13; and
a housing that houses the cell stack apparatus.

15. A fuel cell apparatus, comprising:
the fuel cell module according to claim 14;
an auxiliary machine configured to operate the fuel cell module; and
an exterior case that houses the fuel cell module and the auxiliary machine.

* * * * *